(12) United States Patent  (10) Patent No.: US 6,670,724 B2
Ely et al.  (45) Date of Patent: Dec. 30, 2003

(54) SERIES PASS OVER-VOLTAGE PROTECTION CIRCUIT FOR A MOTOR VEHICLE ELECTRICAL SYSTEM

(75) Inventors: Jeffrey A. Ely, Kokomo, IN (US); James W Ananias, Indianapolis, IN (US); Tillasthanam V. Sriram, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 62 days.

(21) Appl. No.: 10/159,796

(22) Filed: May 31, 2002

(65) Prior Publication Data

US 2003/0222499 A1 Dec. 4, 2003

(51) Int. Cl.[7] ............................. H02H 3/18; H02H 7/06
(52) U.S. Cl. ...................... 307/10.1; 307/130; 361/91.1
(58) Field of Search ............................... 307/10.1, 9.1, 307/10.6, 116, 125, 130, 131, 135; 361/18, 20, 86, 91.1, 91.5, 91.6, 58

(56) References Cited

U.S. PATENT DOCUMENTS

| | | | | |
|---|---|---|---|---|
| 3,745,362 A | * | 7/1973 | Ballou | 307/10.6 |
| 3,979,642 A | * | 9/1976 | Cath et al. | 361/91.5 |
| 4,005,342 A | * | 1/1977 | Davis | 307/10.1 |
| 4,020,395 A | * | 4/1977 | Erickson et al. | 361/18 |
| 4,305,004 A | * | 12/1981 | Tanaka et al. | 307/10.6 |
| 4,679,112 A | * | 7/1987 | Craig | 361/91.6 |
| 4,703,388 A | * | 10/1987 | Ruhnau | 361/91.6 |
| 5,083,078 A | * | 1/1992 | Kubler et al. | 361/18 |
| 5,241,295 A | * | 8/1993 | Madau | 340/461 |
| 5,463,521 A | * | 10/1995 | Love | 361/58 |
| 5,748,422 A | * | 5/1998 | Heaston et al. | 361/18 |
| 5,796,567 A | * | 8/1998 | Botti et al. | 361/91.5 |
| 5,828,967 A | * | 10/1998 | Ueda | 701/1 |
| 5,962,931 A | * | 10/1999 | Maron et al. | 307/125 |
| 6,144,110 A | * | 11/2000 | Matsuda et al. | 307/10.1 |
| 6,219,214 B1 | * | 4/2001 | Kanai | 361/18 |
| 6,288,881 B1 | * | 9/2001 | Melvin et al. | 361/18 |
| 6,465,996 B2 | * | 10/2002 | Nagata et al. | 323/303 |
| 6,473,284 B1 | * | 10/2002 | Ilic et al. | 361/91.1 |
| 6,538,866 B1 | * | 3/2003 | Hanzawa et al. | 361/91.1 |
| 6,556,401 B1 | * | 4/2003 | Loewen et al. | 361/91.1 |
| 6,606,227 B2 | * | 8/2003 | Rapsinski et al. | 361/86 |

* cited by examiner

*Primary Examiner*—Brian Sircus
*Assistant Examiner*—Roberto J. Rios
(74) *Attorney, Agent, or Firm*—Jimmy L. Funke; Stefan V. Chmielewski

(57) ABSTRACT

An improved series-pass over-voltage protection circuit for a motor vehicle electrical system includes first and second parallel connected power paths that respectively provide low current capability with low quiescent current drain, and high current capability with low on-resistance. The first power path, embodied by a P-channel MOSFET, supplies pass-through battery current to quiescent loads such as an engine control module during periods of vehicle inactivity. The second power path, embodied by at least one N-channel MOSFET, is activated by a gate voltage power supply during periods of vehicle activity. The second power path is configured to limit the circuit output voltage to a higher value than the first power path, so that the over-voltage protection during periods of vehicle activity is accomplished by the second power path.

7 Claims, 2 Drawing Sheets

US 6,670,724 B2

SERIES PASS OVER-VOLTAGE PROTECTION CIRCUIT FOR A MOTOR VEHICLE ELECTRICAL SYSTEM

TECHNICAL FIELD

This invention relates to a motor vehicle electrical system, and more particularly to a series-pass protection circuit that protects an electrical load from over-voltage damage.

BACKGROUND OF THE INVENTION

It is well known that motor vehicle electrical systems are subject to over-voltage under a number of different conditions. For example, jump-starting the engine with an excessive supply voltage subjects the electrical loads to the excessive voltage as well. Also, the ignition voltage is subject to transient surges during so-called load dump events when the vehicle storage battery is disconnected from an engine-driven alternator. In such case, the alternator output voltage can rise well above the nominal charging voltage before the voltage regulator can remove the alternator field winding excitation. For this reason, vehicle electrical systems are typically equipped with shunt suppression devices (Zener diodes or MOVs, for example) that clamp the load voltage to a predetermined value. However, in some cases, the transient over-voltage energy is too high to clamp with shunt devices; in these cases, a series-pass suppression device (such as a linear transistor) can be used. However, this approach is ordinarily ruled out in applications requiring both high operating current capability with low series impedance, and low quiescent keep alive current. These requirements occur, for example, in a heavy-duty electrical system, where the storage battery supplies keep-alive (quiescent) current to the engine control module when the ignition key is off, and the engine-driven alternator supplies high load current during engine operation. Accordingly, what is needed is a series-pass over-voltage protection circuit that has both high operating current capability with low series impedance and low quiescent current draw.

SUMMARY OF THE PRESENT INVENTION

The present invention is directed to an improved series-pass over-voltage protection circuit for a motor vehicle electrical system, including first and second parallel connected power paths that respectively provide low current capability with low quiescent current drain, and high current capability with low on-resistance. The first power path, embodied by a P-channel MOSFET, supplies pass-through battery current to quiescent loads such as an engine control module during periods of vehicle inactivity. The second power path, embodied by at least one N-channel MOSFET, is activated by a gate voltage power supply during periods of vehicle activity. The second power path is configured to limit the circuit output voltage to a higher value than the first power path, so that the over-voltage protection during periods of vehicle activity is accomplished by the second power path.

DESCRIPTION OF THE PREFERRED EMBODIMENT

Figure 1:
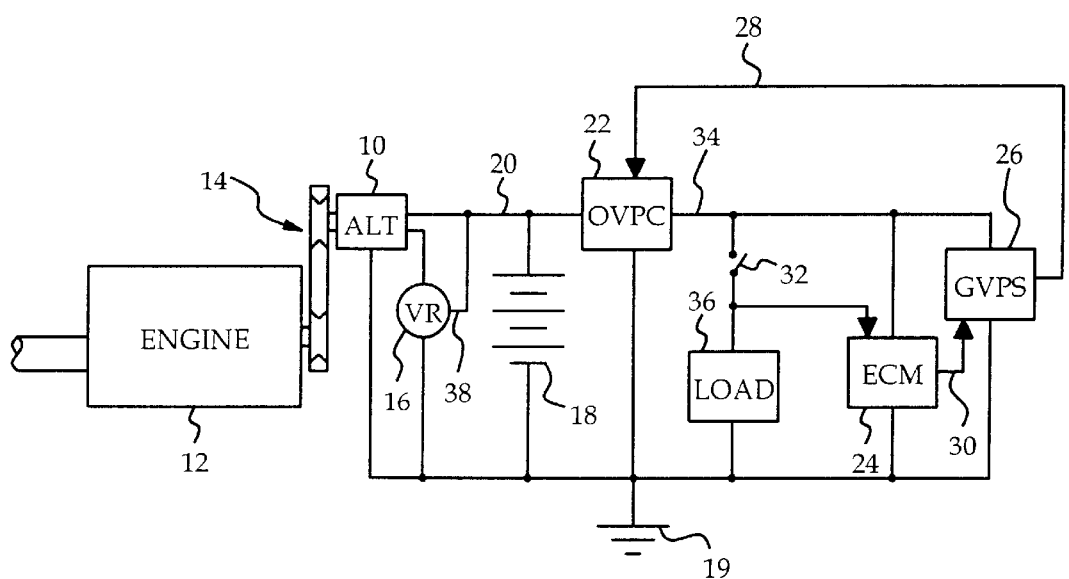
FIG. 1 is a circuit diagram of a motor vehicle electrical system including a series-pass over-voltage protection circuit according to this invention.

Referring to FIG. 1, the over-voltage protection circuit of the present invention is disclosed in the context of a conventional motor vehicle electrical system including an alternator 10 coupled to an engine 12 via a belt and pulley arrangement 14, a voltage regulator 16, and a 24V storage battery 18. The alternator 10 and storage battery 18 are referenced to ground potential 19, and are coupled via line 20 and the over-voltage protection circuit (OVPC) 22 of this invention to various keep-alive electrical loads, including an engine control module (ECM) 24 and a gate voltage power supply (GVPS) 26. As explained below, GVPS 26 develops an elevated gate drive voltage for OVPC 22 on line 28 when activated by ECM 24 via line 30. An ignition switch 32 couples the output of OVPC 22 on line 34 to ECM 24 and various other electrical loads 36. The voltage on line 20 is supplied as an input via line 38 to voltage regulator 16, which compares such voltage to an internal reference voltage (such as 26V), and supplies current to a field winding of alternator 10 for maintaining the voltage on line 20 substantially equal to the internal reference voltage.

As mentioned above, voltages significantly in excess of the normal output voltage of alternator 10 can be produced on line 20 during jump-starting and during load dump events. In heavy-duty environments, typical jump-start voltages may be as high as 80V, particularly in cases where the jump-voltage is obtained from an engine-driven welding generator. Load dump events occur during engine operation when the storage battery 18 becomes disconnected from line 20 due to a loose battery cable or an intermittent internal battery connection, for example. In this case, the alternator output voltage on line 20 can rise well above the internal reference voltage before voltage regulator 16 can scale back the alternator field winding excitation. If the excessive voltage in either situation were passed on to line 34, the electrical loads 24, 26, 36 could easily be damaged unless they were individually protected from over-voltage (which is typically cost-prohibitive). Thus, the function of OVPC 22 is to limit the output voltage on line 34 to voltage that will not damage the loads 24, 26, 36.

In general, OVPC 22 includes first and second power paths connected in parallel between input line 20 and output line 34. The first power path, generally designated by the reference numeral 40 in FIG. 2, supplies pass-through current to keep-alive electrical loads, including ECM 24 and GVPS 26 during periods of vehicle inactivity, and is characterized by its low quiescent current drain. The second power path, generally designated by the reference numeral 42 in FIG. 2, supplies high current to other electrical loads 36 during periods of vehicle activity (e.g., when ignition switch 32 is closed), and is characterized by its low on-resistance.

Figure 2:
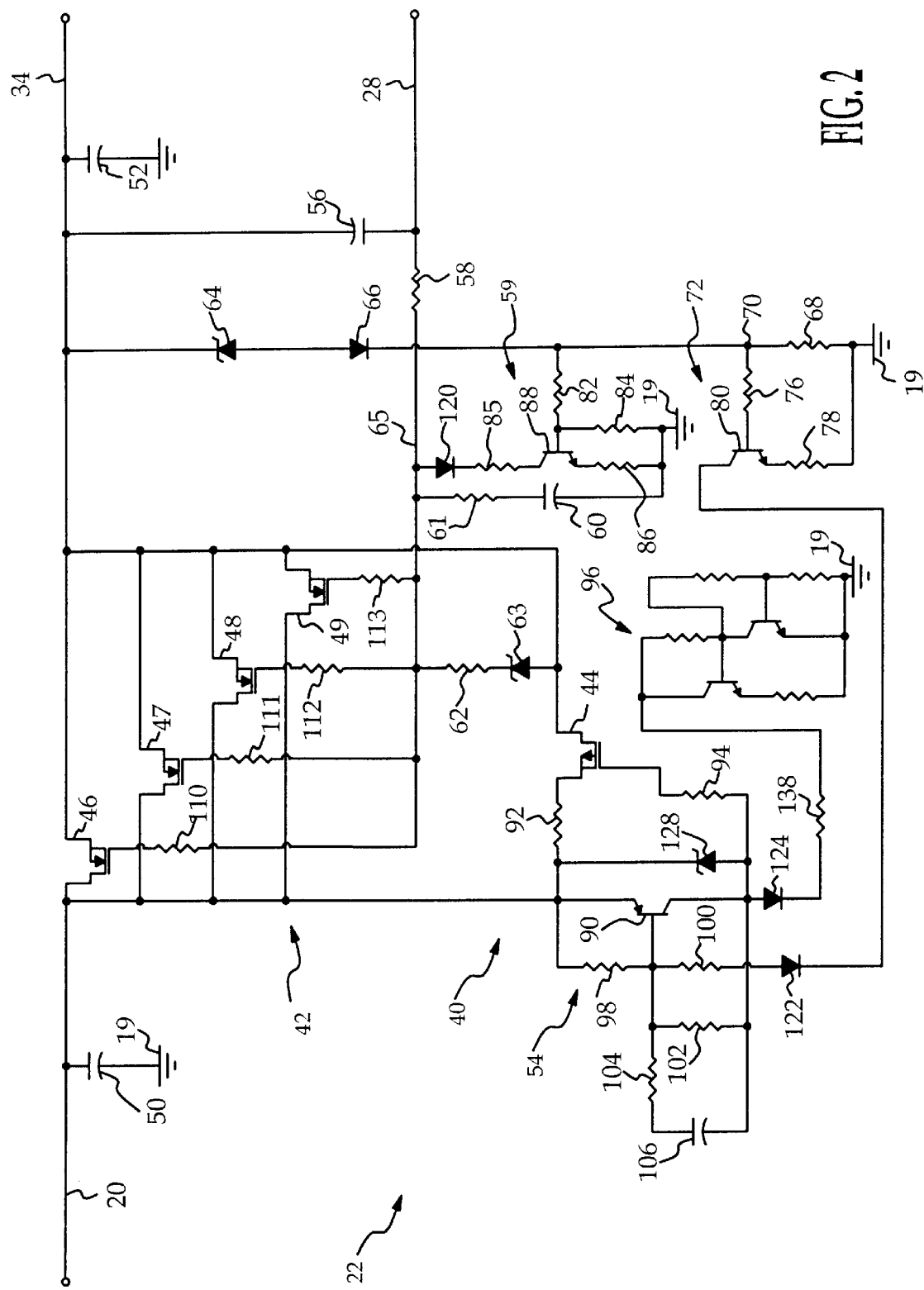
FIG. 2 is a circuit diagram of the series-pass over-voltage protection circuit of FIG. 1.

Referring to FIG. 2, the first power path 40 is implemented with a single P-channel MOSFET (PFET) 44; and the second power path 42 is implemented with a set of parallel-connected N-channel MOSFETs (NFETs) 46, 47, 48, 49, or alternatively, a single N-channel MOSFET. Input capacitive filtering is provided by the capacitor 50, and output capacitive filtering is provided by the capacitor 52. The PFET 44 is activated by the gate drive circuit 54 during both on and off periods of engine 12, whereas the NFETs 46–49 are activated by the output of GVPS 26 on line 28 whenever ignition switch 32 is closed. The capacitor 56 filters the DC output voltage of GVPS on line 28, and the resistor 58 provides a source impedance that cooperates with the over-voltage regulation circuit 59 to regulate the conduction of NFETs 46–49 during over-voltage conditions, as explained below. The serially connected capacitor 60 and resistor 61 form a compensation network, and zener diode 63 provides gate over-voltage protection for the NFETs 46–49. The zener diode 128 provides similar protection for the PFET 44. Resistor 62 limits the current through zener diode 63 and transistor 88 when the over-voltage regulation circuit 59 pulls the voltage on line 65 negative with respect to output line 34.

Zener diode 64, reverse voltage protection diode 66, and resistor 68 are connected in series between output line 34 and ground potential 19 to develop a control voltage at node 70 whenever the output voltage exceeds the breakdown voltage of Zener diode 64 (which may be 30V, for example). The node 70 is connected as an input to first and second over-voltage regulation circuits 72 and 59 which respectively regulate the gate voltages of the first and second power paths 40 and 42 to limit the output voltage on line 34. The first over-voltage regulation circuit 72 includes a transistor 80 that couples the gate drive circuit 54 to ground through resistors 100 and 78, and the voltage at node 70 is applied to the base of transistor 80 through the resistor 76. The second over-voltage regulation circuit 59 includes a transistor 88 that couples the gates of NFETs 46–49 to ground through gate resistors 110–113 and resistors 85 and 86, and the voltage at node 70 is divided by the resistors 82 and 84 before being applied to the base of transistor 88. The resistor values are selected such that the second over-voltage regulation circuit 59 has a higher voltage regulation set point than the first over-voltage regulation circuit 72; consequently, the over-voltage protection is actually accomplished by the second power path 42.

The gate drive circuit 54 for PFET 44 includes a bipolar transistor 90 having an emitter coupled to input line 20 and to the source of PFET 44 via resistor 92. The collector of transistor 90 is coupled to ground potential 19 through a constant current sink 96, and the resistor 94 provides source feedback to stabilize the gain of PFET 44. The base of transistor 90 is coupled to the over-voltage regulation circuit 72 as explained above, and to the resistors 102, 104 and capacitor 106, which provide voltage feedback during linear operation of the transistor 90, and compensation for improved stability.

The OVPC 22 additionally includes a number of diodes 66, 120, 122, 124 that have only a marginal affect on the operation of the circuit 22, but effectively block reverse voltages in the event that a jump voltage of incorrect polarity is applied across battery 18.

The operation of the above-described elements will now be described in the context of both normal and over-voltage conditions. During periods of vehicle inactivity, the transistors 80 and 90 are non-conductive, and the current sink 96 serves to bias PFET 44 to a fully enhanced state, providing a low quiescent current drain conduction path between battery 18 and keep-alive loads including ECM 24 (and GVPS in the illustrated embodiment). If an over-voltage on line 34 occurs during this condition, the transistors 80 and 90 are biased into conduction to reduce the gate-to-source voltage of PFET 44; this reduces the conduction of PFET 44, thereby regulating the output voltage on line 34 to a value (such as 32V, for example) determined by the over-voltage regulation circuit 72. During periods of vehicle activity (signaled in the illustrated embodiment by closure of ignition switch 32), the ECM 24 activates GVPS via line 30 to supply a boosted gate drive voltage on line 28. This biases NFETs 46–49 to a fully enhanced state through input resistor 58 and gate resistors 110–113, providing a high current capability, low resistance, path through which alternator 10 and/or battery 18 can supply current to electrical loads 36. If an over-voltage on line 34 occurs during this condition (due to jump-starting or load-dump, for example), the transistors 80 and 88 are biased into conduction to limit the voltage seen by the loads 24, 26, 36 on line 34 to a value (such as 34V, for example) determined by the over-voltage regulation circuit 59. Since the over-voltage regulation circuit 59 has a higher voltage regulation set point than over-voltage regulation circuit 72, the PFET 44 of the first power path 40 is biased non-conductive before the NFETs 46–49 of the second power path 42, and the output voltage regulation is actually achieved by the NFETs 46–49 of the second power path 42. When the over-voltage condition is terminated, the transistors 80 and 88 return to a non-conductive state, and the PFET 44 and NFETs 46–49 are returned to the fully enhanced state.

In summary, the over-voltage protection apparatus of the present invention provides a simple and effective expedient for protecting electrical load devices from damage due to over-voltage, and addresses the conflicting requirements of providing both a low quiescent current drain battery pass-through for keep-alive electrical loads during periods of vehicle inactivity, and a high current, low on-resistance path for high current electrical loads during periods of vehicle activity. While described in reference to the illustrated embodiment, it is expected that various modifications in addition to those mentioned above will occur to persons skilled in the art. For example, GVPS 26 may be directly connected to battery 18 if desired, and a signal other that ignition key-on can be used to activate GVPS 26. Additionally, the first power path 40 can be explicitly deactivated whenever the second power path 42 is active, the NFETs 46–49 of the second power path 42 could be replaced by a switching supply, or by a lesser or greater number of transistors, or by transistors of a different type, such as bipolar transistors, and so on. Accordingly, it should be understood that protection circuits incorporating such modifications may fall within the scope of this invention, which is defined by the appended claims.

What is claimed is:

1. A series-pass over-voltage protection circuit for a motor vehicle electrical system including a storage battery, a keep-alive electrical load designed to be powered during periods of vehicle inactivity, and switched electrical loads designed to be powered during periods of vehicle activity, comprising:

a first power path coupling said storage battery to said electrical loads;

a first control circuit for activating said first power path during the periods of vehicle inactivity to supply operating voltage to said keep-alive electrical load;

a second power path coupling said storage battery to said electrical loads in parallel with said first power path;

a second control circuit for activating said second power path during the periods of vehicle activity to supply operating voltage to said switched electrical loads and said keep-alive electrical loads; and over-voltage responsive circuitry for adjusting the activation of said first and second power paths when said operating voltage is excessive for regulating said operating voltage to a value that will not damage said electrical loads.

2. The over-voltage protection circuit of claim 1, wherein said first power path comprises at least one P-channel MOSFET, and said second power path comprises at least one N-channel MOSFET.

3. The over-voltage protection circuit of claim 2, wherein said second control circuit includes a gate voltage power supply for producing a gate voltage in excess of said operating voltage for activating said second power path during the periods of vehicle activity.

4. The over-voltage protection circuit of claim 1, wherein the periods of vehicle activity and vehicle inactivity are defined by a state of a vehicle ignition switch or other vehicle activity indicator.

5. The over-voltage protection circuit of claim 1, wherein said first control circuit additionally activates said first power path during the periods of vehicle activity, and when said operating voltage is excessive, the over-voltage responsive circuitry deactivates said first power path while adjusting the activation of said second power path to regulate said operating voltage to said value that will not damage said electrical loads.

6. The over-voltage protection circuit of claim 5, wherein the over-voltage responsive circuitry comprises:

a first over-voltage regulation circuit configured to regulate said operating voltage at a first value; and a second over-voltage regulation circuit configured to regulate said operating voltage at a second value that is higher than said first value.

7. The over-voltage protection circuit of claim 1, wherein said first power path includes at least one P-channel MOSFET having a source that is coupled to a positive terminal of said storage battery and a drain that is coupled to said electrical loads, and wherein said first control circuit includes a constant current sink through which a gate of said P-channel MOSFET is referenced to a negative terminal of said storage battery.

* * * * *